United States Patent
Brouwer et al.

(10) Patent No.: US 7,631,978 B2
(45) Date of Patent: Dec. 15, 2009

(54) WING MIRROR UNIT

(75) Inventors: Stefan Frits Brouwer, The Hague (NL); Arjen Van Gelderen, Benschop (NL); Paulus Gerardus Maria Van Stiphout, Woerden (NL)

(73) Assignee: MCi (Mirror Controls International) Netherlands B.V., Montfoort (NL)

( * ) Notice: Subject to any disclaimer, the term of this patent is extended or adjusted under 35 U.S.C. 154(b) by 315 days.

(21) Appl. No.: 10/553,553

(22) PCT Filed: Apr. 15, 2004

(86) PCT No.: PCT/NL2004/000256

§ 371 (c)(1), (2), (4) Date: Aug. 21, 2006

(87) PCT Pub. No.: WO2004/091975

PCT Pub. Date: Oct. 28, 2004

(65) Prior Publication Data

US 2006/0285235 A1    Dec. 21, 2006

(30) Foreign Application Priority Data

Apr. 18, 2003 (NL) .................................. 1023228

(51) Int. Cl.
*G02B 5/08* (2006.01)

(52) U.S. Cl. ..................................... 359/841; 359/872

(58) Field of Classification Search ................ 359/877, 359/841, 872, 875
See application file for complete search history.

(56) References Cited

U.S. PATENT DOCUMENTS

| 4,548,483 | A | * | 10/1985 | Moro et al. ................. 248/478 |
| 4,609,265 | A | * | 9/1986 | McKee et al. ................ 359/843 |
| 4,696,727 | A | * | 9/1987 | Mukhtar et al. ............. 204/206 |
| 4,969,727 | A | | 11/1990 | Harloff et al. |
| 5,940,230 | A | * | 8/1999 | Crandall ..................... 359/841 |
| 2001/0028517 | A1 | | 10/2001 | Juraschek |

FOREIGN PATENT DOCUMENTS

| DE | 3529215 | 2/1987 |
| FR | 2759044 | 8/1998 |
| JP | 60107433 | 6/1985 |

* cited by examiner

*Primary Examiner*—Stephone B Allen
*Assistant Examiner*—J. L. Doak
(74) *Attorney, Agent, or Firm*—Dykema Gossett PLLC

(57) ABSTRACT

A wing mirror unit for a vehicle includes a base plate, a supporting frame pivotally connected to the base plate, and an actuator including an engaging part that is connected to the supporting frame. The supporting frame is pivotal with respect to the base plate between a folded orientation and an unfolded orientation. The engaging part in operable connection with the supporting frame is adjustable between a first orientation located near the body of a vehicle and a second orientation located farther outward with respect the body of said vehicle.

24 Claims, 1 Drawing Sheet

WING MIRROR UNIT

The invention relates to a wing mirror unit, in particular for a motor vehicle, comprising a base plate, on which by means of a pivot construction a supporting frame is provided, further comprising an electric actuator, with which the supporting frame is pivotal with respect to the base plate between a folded orientation, in which the supporting frame substantially abuts along the body of the motor vehicle, and an unfolded orientation, in which the supporting frame is substantially oriented transversely to the body.

Such a wing mirror unit is, for instance, known from NL 1 019 258, in which a pivot construction is described for pivotally coupling the supporting frame to the base plate in a manner poor in vibrations. In the folded orientation, the supporting frame abuts substantially along the body of the motor vehicle, so as to reduce the total width of the motor vehicle. This orientation provides more maneuvering space, for instance during parking. In the unfolded orientation, the supporting frame abuts substantially in the transverse direction, so that the wing mirror unit is ready for normal use by a driver of the motor vehicle.

It is desirable to adjust the wing mirror unit in the unfolded orientation such that the air resistance and the noise production of air flowing along the unit remains minimal, while the mirror glass of the wing mirror unit yet gives a good view. In the folded orientation, the aim is directed to a position of the wing mirror unit in which the total width of the motor vehicle is minimized. In practice, the above requirements are not very compatible, so that in the design a position is chosen that form a compromise between the conflicting requirements. Consequently, in the folded and/or unfolded orientation, the wing mirror unit is not in an optimal position.

The invention has for its object to provide a wing mirror unit of the type mentioned in the opening paragraph, in which, while retaining the advantages, the above drawbacks are avoided. To this end, the electric actuator of the wing mirror unit according to the invention is provided with an engaging part coupled with the supporting frame, which engaging part is adjustable with respect to the base part substantially transversely to the body between a first orientation located near the base plate and a second orientation located farther outward with respect to the body.

By adjusting the supporting frame transversely to the body, an extra degree of movement is obtained in the design of the pivot construction, so that the position of the supporting frame can be optimized in the two above orientations, namely in the folded orientation with respect to the maximum width of the motor vehicle, and in the unfolded orientation with respect to the noise reduction and minimization of the air resistance.

In an advantageous embodiment according to the invention, the pivot construction of the wing mirror unit comprises a main pivot. In an emergency situation, such as, for instance, when coming into contact with an object, the supporting frame can pivot around the main pivot toward or into the folded orientation, for instance to an emergency folded orientation located between the unfolded orientation and the folded orientation. This reduces the risk of injury and material damage in case of collisions. After pivoting to the emergency folded orientation, the wing mirror unit can pivot back again around the main pivot to the unfolded orientation, so that the original position is obtained again.

By adjusting the main pivot transversely to the body between a first orientation located near the base plate and a second orientation located farther outward with respect to the body, it is ensured that the wing mirror unit can be pivoted practically completely flat against the body, so that a minimum width of the vehicle in the parking position is obtained, while simultaneously satisfying legal restrictions prevailing in many countries, which, in the unfolded orientation of the wing mirror unit, only admit a limited distance between the base plate and the main pivot. This is in contrast with many known wing mirror units which satisfy the above legal restrictions, and which have a main pivot at a fixed distance with respect to the base plate. In such wing mirror units, it is problematic because of the conflicting limiting conditions to pivot the wing mirror unit into an orientation in which the wing mirror unit abuts completely flat against the body.

Preferably, the engaging part supports the main pivot, so that a pivot element for coupling the engaging part of the actuator to the supporting frame is advantageously integrated with the main pivot.

Preferably, in the folded orientation of the wing mirror unit, the end is in the second orientation located farther outward, so that the supporting frame can pivot farther to the body, thereby reducing the total width of the motor vehicle, although the supporting frame is precisely within the orientation located outward. Advantageously, in the unfolded orientation of the wing mirror unit, the end is further in the folded orientation located near the base plate, so that slits that may be present through the more inward position are diminished and the air resistance is reduced.

Further advantageous embodiments of the invention are defined in the subclaims.

The invention will be explained in more detail on the basis of exemplary embodiments, which are shown in the drawing. In the drawing.

The figures are only diagrammatic representations of preferred embodiments of the invention. In the figures, similar or corresponding parts are denoted by the same reference numerals.

Figure 1:
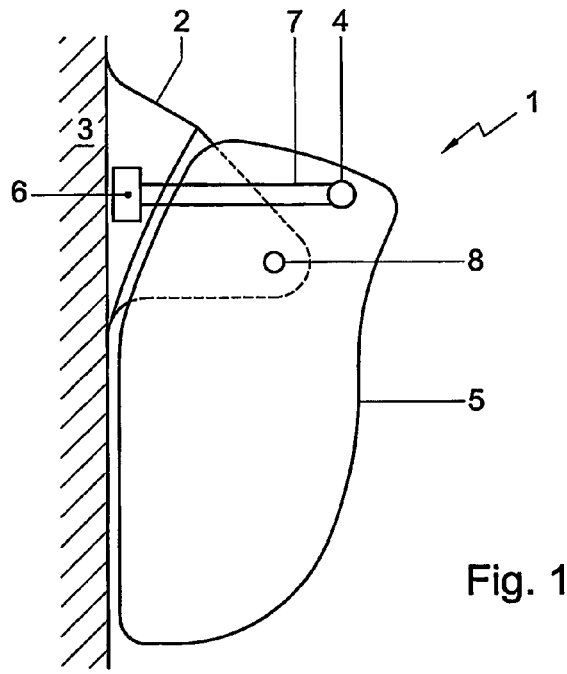
FIG. 1 shows a diagrammatic top view of a wing mirror unit according to the invention in the folded orientation.

In FIG. 1, a wing mirror unit 1 is shown, which comprises a base plate 2 for attachment to the body 3 of a motor vehicle. Provided on the base plate 2 is a main pivot 4, which forms part of a pivot construction. With the aid of the main pivot 4, a supporting frame 5 is pivotally attached to the base plate 2. In case of emergency operation, the supporting frame 5 can pivot over the main pivot 4 both forward and backward, so as to limit injury and material damage in case of collisions.

Figure 2:
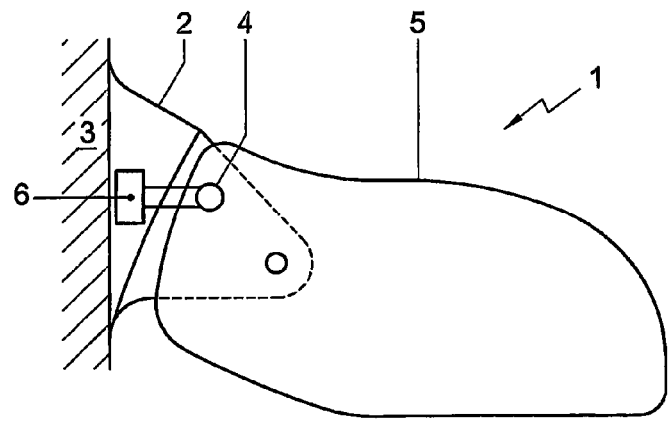
FIG. 2 shows a diagrammatic top view of the wing mirror unit of FIG. 1 in the unfolded orientation.

Further attached to the base plate 2 is an actuator, which comprises an actuator housing 6 with a driving arm designed as spindle 7, for pivoting the supporting frame 5 with respect to the base plate 2 around an auxiliary pivot 8 from a folded orientation to an unfolded orientation, and conversely. Located at the end of the spindle 7 is an engaging part, which is attached to the main pivot 4. FIG. 1 shows the wing mirror unit 1 in the folded orientation, in which the supporting frame 5 abuts substantially flat against the body 3 of the motor vehicle, so that the motor vehicle as less as possible projects from the body. In the unfolded orientation, as shown in FIG. 2, the supporting frame 5 is oriented substantially transversely to the longitudinal direction of the body 3, so that, via the wing mirror unit 1, a driver of the motor vehicle can form an image of the view behind the vehicle without turning his head backward.

During pivoting of the wing mirror unit by controlling the electric actuator, the spindle 7 adjusts, in an adjusting direction, substantially transversely to the body 3 from a first orientation located near the base plate 2 to a second orientation located farther outward with respect to the body 3, so that the main pivot 4, too, adjusts in the adjusting direction, and a translation of the main pivot 4 is obtained. When within the context of the application reference is made to adjusting transversely to the body, this is understood to mean that the adjusting direction comprises a component in the direction transverse to the body 3. The adjusting direction may also comprise components in other directions, such as, for instance, in a direction substantially parallel to the body 3 and directed backward. In FIGS. 1 and 2, the adjusting direction is practically transverse to the body 3. In another embodiment, the adjusting direction is, for instance, directed diagonally backward.

During pivoting of the wing mirror unit 1 from the folded orientation to the unfolded orientation, the main pivot 4 adjusts from the second orientation to the first orientation located near the base plate 2, so that the wing mirror unit assumes a favorable aerodynamic form. When pivoting to the folded orientation, the main pivot 4 adjusts by controlling the actuator just outward, so that the supporting frame 5 abuts close to the body 3 and only assumes a limited space.

Since for the position of the main pivot 4 in unfolded orientation of the wing mirror unit 1, because of prevailing standards, only a limited offset with respect to the body 3 is allowed, the optimization of the position of the supporting frame 5 with respect to the base plate 2 is limited, in particular in case the wing mirror unit 1 has significant dimensions in the direction transverse to the mirror glass provided on the wing mirror unit. However, by adjusting, as described above, the main pivot 4 during pivoting substantially in transverse direction, more freedom of design is created for the optimization of positions, while yet the prevailing standards are satisfied.

The auxiliary pivot 8 in FIGS. 1 and 2 comprises on the supporting frame 5 two journals being under spring action, which are received in a recess of the base plate 2. The additional auxiliary pivot 8 may, however, also be designed differently, for instance by forming a projection on the base plate 2 and receiving it in a suitably provided recess of the supporting frame 5. Preferably, projection and recess are beveled, so that decoupling from the auxiliary pivot 8 takes place with a well-defined force and with little risk of damage. In emergency situations, by decoupling, the wing mirror unit 1 can pivot forward or backward without forcing the actuator housing 6. Subsequently, the auxiliary pivot 8 can be restored by pivoting the wing mirror unit 1 so far back that the journals are again received in the recess under spring action.

By controlling the actuator, as shown in FIGS. 1 and 2, the spindle 7 substantially makes a linear movement, namely in the adjusting direction. Since during adjustment of the spindle 7 the main pivot 4 pivots around the auxiliary pivot 8, the end of the spindle 7 adjustable in transverse direction describes no pure translation, but a segment of an arc of a circle, such as the driving rod of a driven wheel. By arranging the spindle 7 with some play with respect to the actuator housing 6, the end thereof can pivot out at the location of the dead center by some degrees with respect to the linear movement, so that the spindle yet remains simple in construction.

In another embodiment, the spindle 7 is attached to the actuator housing 6 so as to be free from play. By receiving the projection of the auxiliary pivot 8 in a trough-shaped recess, it is possible during pivoting of the wing mirror unit 1 to shift the supporting frame 5 somewhat with respect to the base plate 2 in a direction that is oriented substantially transversely to the adjusting direction of the spindle 7. In this embodiment, too, the whole construction therefore remains relatively simple.

Figure 3:
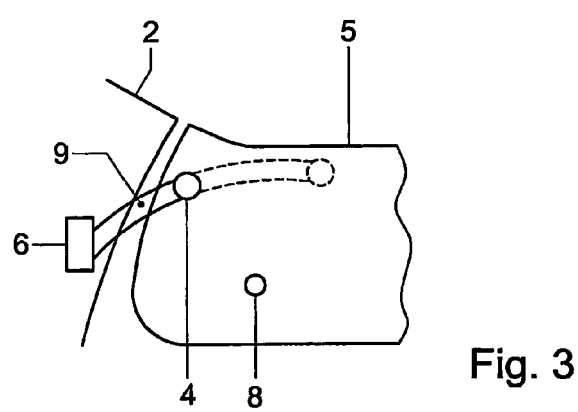
FIG. 3 shows a diagrammatic detailed view of another wing mirror unit according to the invention.

FIG. 3 shows a detailed view of yet another embodiment of the wing mirror unit to be simply implemented, with the driving arm comprising a curved rack 9. In this embodiment, the end of the rack 9, to which the main pivot 4 is attached, follows the path, shown in dash lines in the figure, which the main pivot 4 describes with respect to the base plate 2.

The invention is not limited to the exemplary embodiments described herein. Many variants are possible.

Thus, in the embodiment shown, the main pivot 4 is attached to the end of the spindle 7. It is also possible, however, to have the end, as engaging part, pivotally engage the supporting frame 5 and to couple another part of the supporting frame to the main pivot 4, so that the driving arm is formed, on the one hand, by the spindle 7 and, on the other hand, by the part of the supporting frame 5 between the engaging part of the spindle 7 and the part of the supporting frame that is coupled to the main pivot 4.

Furthermore, it is not necessary to design the driving arm in FIGS. 1 and 2 as a spindle 7. The driving arm may also comprise other driving bodies, such as, for instance, a rack.

Such variants will be apparent to those skilled in the art and are deemed to be within the scope of the invention as defined by the appended subclaims.

The invention claimed is:

1. A wing mirror unit for a vehicle, comprising:
a base plate;
a supporting frame pivotally connected to the base plate about a main pivot and an auxiliary pivot; and
an actuator including an engaging part connected to the supporting frame, the actuator being connected to the main pivot and configured to move the main pivot in a linear path further outwardly from said vehicle than the auxiliary pivot;
wherein the supporting frame is pivotal with respect to the base plate between a folded orientation, in which the supporting frame substantially abuts along a body of said vehicle, and an unfolded orientation, in which the supporting frame is substantially oriented transversely to the body of said vehicle; and
further wherein the engaging part is adjustable between a first orientation located near the body of said vehicle and a second orientation located farther outward with respect the body of said vehicle.

2. The wing mirror unit according to claim 1, wherein the main pivot is configured for pivoting the supporting frame from the unfolded orientation to an emergency folded orientation.

3. The wing mirror unit according to claim 2, wherein the main pivot is adjustable transversely to the body of said vehicle between the first orientation and the second orientation.

4. The wing mirror unit according to claim 2, wherein the engaging part supports the main pivot.

5. The wing mirror unit according to claim 1, wherein the actuator is an electric actuator.

6. The wing mirror unit according to claim 1, wherein the actuator adjusts the engaging part towards and away from the base plate.

7. The wing mirror unit according to claim 1, wherein the actuator is a linear actuator including a driving arm.

8. The wing mirror unit according to claim 7, wherein the driving arm forms the engaging part.

9. The wing mirror unit according to claim 1, wherein the auxiliary pivot is disconnectably anchored or attached to the base plate or the supporting frame.

10. The wing mirror unit according to claim 9, wherein the supporting frame pivots around the auxiliary pivot with respect to the base plate when the actuator adjusts between the folded orientation and the unfolded orientation.

11. The wing mirror unit according to claim 1, wherein the engaging part is configured with play with respect to the actuator.

12. The wing mirror unit according to claim 11, wherein the engaging part, to overcome a dead center during an adjustment, can pivot.

13. The wing mirror assembly according to claim 11, wherein the engaging part is configured with play with respect to the actuator.

14. The wing mirror unit according to claim 1, wherein the actuator includes a driving arm.

15. The wing mirror unit according to claim 14, wherein the driving arm is configured as a curved rack.

16. A wing mirror assembly for a vehicle comprising:
a base plate;
a supporting frame;
a means for pivoting the supporting frame with respect to the base plate; and
an actuator including an engaging part that operatively engages the supporting frame;
wherein the means for pivoting the supporting frame includes a main pivot for pivoting the supporting frame from a folded orientation to an unfolded orientation, an auxiliary pivot for pivoting the supporting frame with respect to the base plate, and the main pivot is configured to move in a linear path further outwardly from said vehicle than the auxiliary pivot.

17. The wing mirror assembly according to claim 16, wherein the engaging part is adjustable between a first orientation located near a body of said vehicle and a second orientation located transversely outwardly with respect to the body of said vehicle.

18. The wing mirror assembly according to claim 17, wherein the main pivot is adjustable transversely with respect to the vehicle between the first orientation and the second orientation.

19. The wing mirror assembly according to claim 16, wherein the engaging part supports the main pivot.

20. The wing mirror assembly according to claim 19, wherein the actuator adjusts the main pivot towards and away from the base plate.

21. The wing mirror assembly according to claim 16, wherein the actuator is a linear actuator including a driving arm, and wherein the driving arm forms the engaging part.

22. A wing mirror system for a vehicle comprising:
a body portion;
a base plate extending from the body portion;
an actuator including an engaging part;
a supporting frame pivotally connected to the actuator about a main pivot and pivotally connected to the base plate about an auxiliary pivot;
wherein the engaging part supports the main pivot and the position of the main pivot is adjustable inwardly and outwardly with respect to the body of said vehicle such that the main pivot point is configured to move from a position that is closer than the auxiliary pivot to said vehicle to a position that is further outwardly from said vehicle than the auxiliary pivot.

23. The wing mirror system according to claim 22, wherein the supporting frame is pivotal with respect to the base plate between a folded orientation, in which the supporting frame substantially abuts along the body of said vehicle, and an unfolded orientation, in which the supporting frame is substantially oriented transversely to the body of said vehicle.

24. The wing mirror system according to claim 22, wherein the main pivot is adjustable along a curved path between a first orientation located near the body of said vehicle and a second orientation located outward with respect to the body of said vehicle.

\* \* \* \* \*